United States Patent Office 3,524,834
Patented Aug. 18, 1970

3,524,834
CROSS-LINKABLE COMPOSITION OF A THERMOPLASTIC POLYMER AND A URETIDIONE OLIGOMER
Dennis Charlton Allport, Runcorn, England, assignor to Imperial Chemical Industries Limited, London, England, a corporation of Great Britain
No Drawing. Filed Dec. 26, 1967, Ser. No. 693,075
Claims priority, application Great Britain, Jan. 2, 1967, 97/67
Int. Cl. C08g 22/26
U.S. Cl. 260—77.5     13 Claims

ABSTRACT OF THE DISCLOSURE

A thermoplastic cross-linkable composition which can be processed at moderately elevated temperatures, e.g., to form a shaped article, and is thereafter cross-linkable by heating to slightly higher temperatures and having as the two essential ingredients (i) a copolymer of specified kind having active hydrogen atoms and (ii) as cross-linking agent at least one uretidione oligomer of an aromatic diisocyanate which is at least trimeric, or a mixture of one or more such uretidione oligomers with at least one uretidione dimer of an aromatic diisocyanate.

---

This invention relates to cross-linkable compositions containing thermoplastic polymers of the kind derived from the polymerisation of mono-ethylenically unsaturated monomers.

Polymers derived from mono-ethylenically unsaturated monomers generally soften or flow on heating and then revert to the solid state on cooling. The cycle can be repeated and this property of permanent fusibility, or thermoplasticity as it is more generally termed, is the prime reason for the utility of these polymers as moulding materials since they can readily be shaped in the softened or molten state at moderately elevated temperatures on suitably designed machinery e.g. injection- and compression-moulding equipment, presses, vacuum-forming equipment, rotational-casting equipment and extruders.

Wilder applications for these thermoplastic polymers could be envisaged, however, if their tendency to soften and flow at these moderately elevated temperatures could be reduced after the shaping process has been completed.

Such reduction can be achieved by cross-linking; a reaction which involves forming chemical links between adjacent polymer chains, either by creating inter-reactable sites on the polymer chains or by introducing a polyfunctional compound capable of reacting with repeating units in the polymer chains, thereby forming a macromolecular network. Methods of cross-linking that have found commerical success, especially in the field of polyethylenes, utilise the former alternative and involve the use of high energy irradiation or the incorporation of free radical generators such as peroxides. Irradiation methods are complex difficult to control and costly if high dosages are required and have only found limited application. The incorporation of peroxides, on the other hand, has been found to yield compositions which tend to cross-link during shaping on conventional machinery such as injection- and compression-moulding machines and extruders whilst in the thermoplastic state and although this disadvantage can be overcome to some extent by modifying the equipment to shorten the dwell times, or by using peroxides having higher dissociation temperatures, both solutions are expensive.

Hitherto, the examination of cross-linking methods involving the addition of a polyfunctional compound has only achieved moderate success because premature reaction between tahe polymer and said polyfunctional compound has generally occurred, thereby rendering shaping difficult if not impossible. However, we believe that we have now reduced the danger of premature reaction by choosing as the polymeric component a copolymer which contains active hydrogen atoms, and as the polyfunctional cross-linking agent to be combined therewith a specified material which is thermally dissociable to diisocyanate. Our experiments have shown that compositions based on these components may be subjected to thermal processes, e.g., milling or shaping, at moderately elevated temperatures, e.g., up to 140° C., for several minutes without inducing undue cross-linking, and yet may be cross-linked quite readily by a further increase in temperature. This is because the rate of dissociation of the polyfunctional compound to polyisocyanate at the lower temperatures is hardly noticeable.

Accordingly, our invention provides a cross-linkable polymeric composition comprising (i) A copolymer in which the majority of the units making up the polymer chains are derived from mono-ethylenically unsaturated monomeric material polymers of which are thermoplastic, and a minor number of the units are derived from a comonomer and contain active hydrogen atoms, and (ii) As polyfunctional compound, at least one uretidione oligomer of an aromatic diisocyanate or a mixture of at least one such oligomer with at least one uretidione dimer of an aromatic diisocyanate, said uretidione oligomer being characterized by containing at least three linked units of aromatic diisocyanate.

Our invention also provides a process for obtaining cross-linked polymer compositions by heating said copolymer with said polyfunctional compound at a temperature above the thermal dissociation temperature of said polyfunctional compound.

It will be readily apparent that this invention is applicable in general to copolymers derived from any monoethylenically unsaturated monomer from which thermoplastic polymers may be derived, either by homopolymerisation or copolymerisation with suitable monomers. All that is required is that said monomers are copolymerisable with comonomers which will provide in the resulting polymer chains units which either have active hydrogen atoms or are convertible to forms having active hydrogen atoms. As is well known, said monomers are commonly found in the group having the structure $CH_2{=}CR_1R_2$ where $R_1$ is generally hydrogen, monovalent hydrocarbon, halogen or nitrile and $R_2$ is hydrogen, alkyl, halogen, —OCOR or COOR where R is monovalent hydrocarbon. The most common examples are vinyl chloride (which yields thermoplastic polymers and copolymers), ethylene, methyl methacrylate and styrene but others include vinylidene chloride and acrylonitrile (the thermoplastic products of both of which are generally copolymers). The invention is particularly described hereinafter with reference to polymers of ethylene as much advantage, e.g., in the production of insulatory sheathing for cables and wires may be gained from the use of these. However, the invention is also applicable to polymers of these other monomers.

These monomers (or mixtures thereof) are copolymerised with suitable comonomers to yield the copolymers which form one component of our cross-linkable compositions. The comonomer will either contain an active hydrogen atom or will yield units in the polymer chains which are thereafter converted to units containing active hydrogen atoms, e.g., by hydrolysis or by reduction. Active hydrogen atoms are most conveniently found in hydroxyl (—OH), carboxylic acid (—COOH) or amino (—NH$_2$) groups and thus examples of the first kind of comonomer can include, e.g., acrylic acid and methacrylamide and examples of the second kind of comonomer can include hydrolysable vinyl esters, e.g., vinyl acetate. Other but less readily available sources of active hydrogen atoms are, for example, groups containing —SH combinations, and as a general statement it may be said that active hydrogen atoms may be defined as hydrogen atoms linked to atoms found in the first two occupied periods of Groups V and VI of the Periodic Table of the Elements. A test for an active hydrogen atom is described in "Rodd's Chemistry of Carbon Compounds," second edition, volume IA, page 62.

By reason of general availability of the parent comonomers, we have found that repeating units having active hydrogen atoms generally have the structure

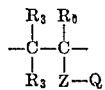

where each $R_3$ is selected from hydrogen or a monovalent hydrocarbon radical (generally an alkyl group having from 1 to 6 carbon atoms or a phenyl group) or the group —Z—Q, Z is a divalent organic radical or a direct linkage and Q is a polar radical having an —OH, —SH, >NH or —NH$_2$ group. In general no more than one $R_3$ will be —Z—Q. Where Z is not a direct linkage, it is preferably a divalent hydrocarbon radical (e.g., methylene, polymethylene, phenylene, etc.) but may also comprise, for example, a chain of carbon atoms interspersed with other atoms, e.g., —(CH$_2$)$_2$O(CH$_2$)$_2$—. Ordinarily, the use of residues wherein Z is a divalent organic radical has little or no advantage over the use of residues where Z is a direct linkage and for reasons of economy and availability of the parent comonomers, therefore, it is advisable to use the latter.

Q may be any polar radical containing an —OH, —SH, >NH or —NH$_2$ group and examples include: —NX$_2$, —CONX$_2$, —SO$_2$NX$_2$, —CONX.NX$_2$, —SO$_2$NX.NX$_2$, —NX.CONX$_2$, —C(:NX)NX$_2$, —C(:NOX)NX$_2$, —NX.OX, —COOH, —CO.OR'OH, —O.CO.R"OH, —OH, —SH, —P(:O)OH, —CH:NOH and —C$_6$H$_4$OH where in each radical at least one X represents a hydrogen atom, other X's being hydrogen atoms or monovalent hydrocarbon radicals, R' represent a divalent hydrocarbon group having a structure such that a phenylene group and/or a chain of at least 2, and generally from 2 to 10, carbon atoms links the ester group to the hydroxyl group and R" represents a divalent hydrocarbon group having a structure such that a phenylene group and/or a chain of one or more carbon atoms (generally 1 to 10 carbon atoms) links the ester group to the hydroxyl group. However, Q will commonly be —OH, —CONH$_2$ or —COOH: examples of readily available comonomers containing Q being acrylamide, methacrylamide, acrylic acid, methacrylic acid, 2-hydroxyxethyl methacrylate, 2-hydroxyethyl acrylate and similar derivative of methacrylic acid or acrylic acid and higher alkylene oxides.

Since the reaction of diisocyanates with polymers having —COOH groups tends to yield carbon dioxide and since many polymers having hydroxyl (—OH) groups tend to have an undesirably high rate of reaction with isocyanate groups, it is generally preferred to use comonomers having —CONH$_2$ groups, particularly acrylamide and methacrylamide whose copolymerisation is well known, in the preparation of the copolymers for use in our composition.

The copolymerisation required to obtain the modified thermoplastic polymers may be effected by known processes and the methods and details of preparation peculiar to any particular combination of monomers may be deduced from simple experiment by any chemist with ordinary skill in the art of polymerisation.

While block or graft copolymers may be used in our compositions, random copolymers are the most suitable and therefore, as is well known, where monomers of widely differing reaction rates are to be copolymerised it may be necessary to add at least the more reactive monomer continuously to the polymerisation vessel.

To retain the essential character of the thermoplastic polymer, it is generally preferred to retain a major part, e.g. 99 to 60% by weight, of the principal monomer or monomers in the copolymer. On the other hand, the incorporation of at least 2% and generally from 2 to 25% by weight of comonomer having the active hydrogen atom is generally desirable in order to obtain products showing usefully reduced tendencies to flow on heating after they have been cross-linked. The preferred range is 2 to 6%.

The above described copolymers form one of the components of the compositions of our invention. The other components are chosen from trimeric or higher polymeric uretidione oligomers of aromatic diisocyanates or from mixtures of these with each other and/or with uretidione dimers of aromatic diisocyanates.

The trimeric or higher polymeric uretidione oligomers which may be used as the polyfunctional compounds may be represented by the formula

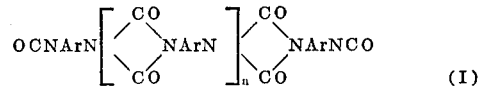

where Ar is a divalent organic residue such that each isocyanate group is linked directly to an aromatic nucleus and $n$ is an integer of at least one, e.g., 1–20 and usually 1 to 8. Such oligomers may be formed from aromatic diisocyanates which are free of substituents ortho to the isocyanate groups, particularly diisocyanates having a structure comprising two aromatic residues each carrying an isocyanate group as the sole substituent and being linked together either meta or para to each of the said isocyanate groups by a direct linkage or by a suitable divalent atom or group, e.g., —O—, —S—, —SO—, —SO$_2$—, —CO—, alkylene, e.g., —CH$_2$— and dioxyalkylene, e.g., —OCH$_2$CH$_2$O—.

They may be formed by dissolving the diisocyanate in an organic solvent in the presence of an organic base, e.g., a tertiary amine. Warming the solution generally increases the molecular weight of the product. The oligomers generally precipitate from solution. In some instances, e.g., as in the case of 4,4'-diphenylmethane diisocyanate, polymerisation to the trimeric or higher oligomeric forms may occur if the catalyst-containing solution is merely left to stand at room temperature. In most cases, the products are generally mixtures of oligomers of varying molecular weight, sometimes in admixture with dimer also.

The uretidione dimers that may be used in admixture with the trimeric and higher polymeric uretidione oligomers in the compositions of our invention may be represented by the structure I above with the modification that $n$ is zero. The dimer need not necessarily be derived from the same diisocyanates as the higher uretidione oligomers used in our compositions. For example, they may be derived from aromatic diisocyanates having substituents ortho to the isocyanate groups, e.g., as in 3,3'-dimethyl-4,4'-diisocyanatodiphenyl methane.

We have found that the higher the molecular weight of the uretidione oligomers used, or in the case of mixtures of such oligomers alone or with uretidione dimers the higher the average molecular weight of the mixture, the lower the tendency of the compositions of the invention to cross-link prematurely during thermal processing at moderately elevated temperatures. This has the advantage of allowing more freedom in the choice of conditions for milling and/or shaping operations. In particular, somewhat higher temperatures and/or longer times may be used than in the case where the polyfunctional compound is a simple uretidione dimer, for example.

Our experience has shown that in general the compositions of the present invention are sufficiently stable at elevated temperatures up to 140° C. or even higher to allow successful thermal processing such as milling and/or shaping and yet are cross-linked without difficulty with only a moderate increase in temperature so that temperatures of, for example, 180–200° C. may be used.

The actual dissociation temperatures of individual uretidione oligomers will vary from compound to compound, and particularly with change in molecular weight, and therefore it is possible, having regard to the nature of the copolymer and the shaping process for which it is designed, to choose from the general class of our uretidione oligomers one or more compounds that have particularly suitable thermal dissociation characteristics. Ideally, the polyfunctional compound should be such that mild cross-linking is caused to occur during shaping, the extent of the cross-linking not being such as to interfere with successful completion of the shaping process by prematurely yielding an infusible material but being such that the minimum of additional heat treatment is required after shaping to obtain the desired improvements to the properties of the composition. Obviously, the choice of the polyfunctional compound to achieve this will depend (a) upon the nature of the copolymer, including the choice and relative concentrations of the constituent monomers, since this will determine to a first approximation the range of conditions that will have to be employed for shaping the composition, and (b) upon the nature of the thermoplastic shaping step, e.g., milling, extrusion, injection-moulding, compression moulding, pressing, vacuum-forming or rotational casting, since this will determine more exactly the temperature of the shaping step and will also determine the time for which the composition is held at that temperature. Thus, having established from the nature and intended end use of the copolymer the conditions that will be prevalent during fabrication, it is then possible to select a polyfunctional compound having a suitable dissociation temperature. The dissociation temperature of any polyfunctional compound may be established by simple experiment; for example, by observing the appearance of polyisocyanate species on a mass spectrometer.

Examples of uretidione oligomers that may be used in the compositions of our invention are those derived from the 4,4'-, 3,3'- and 3,4'-diisocyanates of diphenyl ether, diphenyl thioether, diphenyl methane, 2,2-diphenyl propane, 1,2-diphenoxy ethane, 1,2-diphenyl ethane, 1,1-diphenyl cyclohexane, triphenyl methane, diphenyl sulphone and benzophenone.

We have found that these uretidione trimers and higher oligomers and mixtures thereof with each other and/or with dimers are particularly suitable for use in compositions with copolymers wherein the active hydrogen atoms are amidic in nature, e.g., as in copolymers of ethylene with acrylamide and methacrylamide. The oligomers of 4,4'-diphenylmethane diisocyanate may be singled out because they may be obtained readily and without difficulty from the commercially available monomer and give compositions which are sufficiently unreactive at operating temperatures of up to 140° C. or even higher to be worked without much difficulty and yet may be cross-linked at about 190° C.

The amount of polyfunctional compound that should be used in our composition is preferably related to the quantity of active cross-linkable radicals in the copolymer. However, the ratio of the two is not critical and may be varied within wide limits. It may not be desirable to use more of the polyfunctional compound than the stoichiometric quantity required for combination with all the reactive groups of copolymer, and even as little as 0.025 molar proportion of said compound per molar proportion of reactive group produces a useful effect.

As already stated, the proportion of active units in the copolymer chain may be varied over a wide range and the degree of utilisation of these units may be varied at the discretion of the operator thereby giving a useful choice of cross-linkable compositions which may be adapted to diverse end requirements. For example, to obtain a partially cross-linked product a copolymer containing a low proportion of active units may be combined with a stoichiometric proportion of polyfunctional compound or a copolymer containing a higher proportion of active units may be combined with a less than stoichiometric proportion of polyfunctional compound. Alternatively, where it is desired to obtain a highly cross-linked composition a high proportion of active units may be used in the copolymer which is then combined with a stoichiometric quantity of polyfunctional compound.

By way of example, we have found that in the case of copolymers of ethylene containing from 2 to 25% by weight of methacrylic acid, methacrylamide or acrylamide units, treatment with one quarter of the amount of polyfunctional compound required for complete reaction with all reactive groups will usually be found to give an adequate degree of cross-linking for the conferment of improved high temperature properties without undue loss of a desirable degree of flexibility and transparency in the product.

Our compositions may be formed by mixing the copolymer and polyfunctional compound in any suitable manner. For example, they may be blended on a malaxator such as a heated roll-mill at a temperature which is preferably sufficient to bring the copolymer into a fluid state but is not above the temperature at which the polyfunctional compound dissociates so rapidly as to interfere with successful processing, temperatures of up to 140° C., or possibly somewhat above, being generally satisfactory. In an alternative process the polyfunctional compound may be incorporated in a solution of the copolymer in a suitable solvent, but removing the last traces of solvent from the composition so formed is often both difficult and costly. If desired, the polyfunctional compound may also be blended with a homopolymer of the principal monomer of the copolymer and this blend may be mixed in suitable proportions with the copolymer.

In addition to the copolymer and polyfunctional compound our compositions may also contain further components, if desired. For example it may be useful to incorporate a catalyst for the thermal dissociation of the polyfunctional compound. Additionally, fillers such as graphite, carbon black glass and asbestos fibre, finely divided metals and metal oxides, etc., may be added as may foaming agents, heat and u.v. stabilisers, pigments, dyes and the like.

Our compositions may be cross-linked by heating them to a temperature at which the polyfunctional compound dissociates rapidly, i.e., generally to a temperature in excess of 160° C. For ethylene copolymers, the temperature is preferably 160° C. to 220° C., particularly 180 to 200° C., and for the copolymers of other monomers the preferred temperatures should be adjusted appropriately. Because of the risk of oxidative degradation of many of the specified copolymers at the high temperatures sometimes involved, it may be desirable to conduct the cross-linking in an inert atmosphere.

With suitable choice of operating conditions and/or polyfunctional compound, the compositions may be shaped before the cross-linking has proceeded to the extent that the material is no longer thermoplastic. Any of the usual shaping processes may be used. For example, the compositions may be injection-moulded, compression-moulded, extruded, pressed, vacuum-formed or rotationally cast. With careful choice of polyfunctional compound, a desired amount of cross-linking may be effected during the fabrication step thereby reducing the amount of additional heat required to complete cross-linking.

After the shaping step, the cross-linking, or the completion of the cross-linking, may be effected as desired.

The products may be used as pipes and sheathings for pipes and hoses, as wire and cable insulation and as moulded parts, e.g., in small engineering applications and in many other applications where use can be made of their resistance to oils and acids, their relatively low thermal expansion coefficients for plastics materials, their electrical insulation properties and their resistance to creep under load and to stress cracking. They may also be used in the form of foams and as heat shrinkable film and sheathings.

A particularly preferred product is that obtained from a composition in which the copolymer is a copolymer of ethylene with methacrylamide containing 2–6% by weight of methacrylamide.

The invention is now illustrated with reference to copolymers of ethylene with methacrylamide but the chemist will recognize that by analogy it is equally applicable to polymers having active hydrogen atoms and which are based on other ethylenically unsaturated monomers, e.g., vinyl chloride, methyl methacrylate and styrene. Equally, the active hydrogen atoms may be supplied, if desired, by units from comonomers other than methacrylamide, e.g., acrylamide, methacrylic acid or 2-hydroxy ethyl methacrylate.

In all the examples, all parts are expresesd as parts by weight.

EXAMPLE 1

In each of a series of experiments, 320 parts of freshly distilled 4,4'-diphenylmethane diisocyanate were dissolved in 1500 parts of distilled chlorobenzene in the presence of 1.28 parts of 4-dimethylaminopyridine and the solution was stirred at a predetermined temperature under nitrogen for several hours. In each case solid separated out, usually pale yellow in colour, and this was collected, washed with chlorobenzene and dried.

The average molecular weight of each solid product was determined by estimation of the isocyanate end group content by infrared analysis and the value obtained recorded in the table below.

| Experiment | Reaction conditions | | Average molecular weight of product |
|---|---|---|---|
| | Temperature, °C. | Time (hours) | |
| A | 8–10 | 7½ | 646 |
| B | 20 | 24 | 1345 |
| C | 55 | 24 | 1800 |
| D | 75 | 24 | 2085 |

Thus, the product of Experiment A is essentially a dimer/trimer mixture while the products of B, C and D are comprised mainly of oligomers wherein $n$ is from 4 to 7.

Each of the above samples was milled with an ethylene/methacrylamide copolymer on a steam-heated two-roll mill at about 100° C. The amount of each sample used was the stoichiometric quantity required to react with all the amide groups of the polymer. Each composition was then held at 140° C. for a measured period of time and then its melt viscosity was measured on a cone and plate viscometer and recorded below.

| Polyfunctional compound | Nature of Copolymer | | Recorded melt viscosity at a shear rate of 0.0562 sec.$^{-1}$ |
|---|---|---|---|
| | Percent by weight methacrylamide | Melt flow index | |
| A | 5.9 | 60 | Becomes too high to measure. |
| B | 4 | 2 | 2×10$^6$ poises after 16 min. |
| C | 4 | 2 | 3.4×10$^5$ poises after 30 min. |
| D | 4 | 2 | 3.0×10$^5$ poises after 30 min. |

All compositions could be cross-linked within a few minutes at 190–200° C.

EXAMPLES 2–6

A solution having the constitution described in Example 1 was allowed to stand at room temperature for 72 hours. A pale yellow solid separated out and this was collected, washed with chlorobenzene and dried. The average molecular weight (estimated by analysis of isocyanate end group content) was found to be 726.

This mixture was used in various concentrations and with various ethylene/methacrylamide copolymers to form cross-linkable compositions by milling at about 120° C. These compositions were readily converted to films or moulded samples by use of conventional pressing and moulding techniques using temperatures in the range 120° C. to 140° C. Rapid curing could be effected at 190° C., 15 minutes or less being generally sufficient to achieve 90% cure on a Wallace-Shawbury Curometer.

The cured samples were insoluble in organic liquids known to be solvents for uncross-linked ethylene/methacrylamide copolymers, e.g., boiling tetrahydrofuran, and did not deform when heated to the melting or softening point of the uncross-linked copolymers.

| Ex. | Copolymer | | | Parts of cross-linking agent/100 parts of copolymer | Time to 90% cure at 190° C. (min.) |
|---|---|---|---|---|---|
| | Ethylene (wt. percent) | Methacrylamide (wt. percent) | Melt flow index | | |
| 2 | 94.1 | 5.9 | 60 | 8.65 | 15 |
| 3 | 91.5 | 8.5 | 40 | 6.23 | 3.4 |
| 4 | 91.5 | 8.5 | 40 | 12.46 | 6 |
| 5 | 90.7 | 9.3 | 1.5 | 13.68 | 12.5 |
| 6 | 90.3 | 9.7 | 90 | 14.23 | 9.5 |

The composition of Example 2 was found to be more easily processable and shapeable than those of Examples 3–6.

Similar results may be obtained from the use, for example, of copolymers of ethylene with acrylamide, methacrylic acid or 2-hydroxyethyl methacrylate.

I claim:

1. A cross-linkable composition comprising (i) a copolymer in which the majority of the units making up the polymer chains are derived from mono-ethylenically unsaturated monomeric material, polymers of which are thermoplastic, and a minor number of units are derived from a comonomer and contain an amide (—CONH$_2$) group, and (ii) as poly-functional compound, at least one uretidione oligomer of an aromatic diisocyanate, which oligomer contains at least three linked units of an aromatic diisocyanate, a mixture of at least one such oligomer with at least one uretidione dimer of an aromatic diisocyanate.

2. A composition according to claim 1 in which the comonomer is acrylamide or methacrylamide.

3. A composition according to claim 1 in which the copolymer contains from 1 to 40% by weight of units having an amide (—CONH$_2$) group.

4. A composition according to claim 3 in which the copolymer contains from 2 to 25% by weight of units having an amide (—CONH$_2$) group.

5. A composition according to claim 4 in which the copolymer contains from 2 to 6% by weight of units having an amide (—CONH$_2$) group.

6. A composition according to claim 1 in which the copolymer is a copolymer of ethylene or of vinyl chloride or of methyl methacrylate or of styrene.

7. A composition according to claim 1 in which the copolymer is a copolymer of ethylene and methacrylamide containing 2 to 6% by weight of methacrylamide.

8. A composition as claimed in claim 1 in which the aromatic diisocyanate has the structure

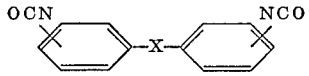

in which X is a direct linkage or a divalent atom or group and each —NCO is linked ortho or para to X.

9. A composition as claimed in claim 8 in which the aromatic diisocyanate is 4,4'-diphenylmethane diisocyanate.

10. A composition according to claim 1 in which the polyfunctional compound is present in an amount of from 2.5 to 100% of the stoichiometric amount required to react with all the active hydrogen atoms in the copolymer.

11. A shaped article formed from a composition as claimed in claim 1.

12. A composition according to claim 1 which has been cross-linked.

13. An insulated wire or cable wherein the insulation comprises a cross-linked composition as claimed in claim 12.

References Cited

UNITED STATES PATENTS 3,419,534  12/1968  Goodman et al. _____ 260—77.5

OTHER REFERENCES

Buckles et al.: J. Am. Chem. Soc., 88, Aug. 5, 1966, pp. 3582–3586.
Arnold et al.: Chem. Rev., 57, 1957, pp. 56 and 57.
Davis: Makromol. Chem., 66, 1963, pp. 196 and 197.
Taub et al.: Dyestuffs, 42, 1958, pp. 263–268.

DONALD E. CZAJA, Primary Examiner

M. J. WELSH, Assistant Examiner

U.S. Cl. X.R.

117—128.4, 232; 260—2.5, 37, 859